Feb. 16, 1965  S. WEGH  3,169,753
ELECTRIC HOUSEHOLD BREAD AND BUTTER AND PASTRY MACHINE
Filed March 26, 1962
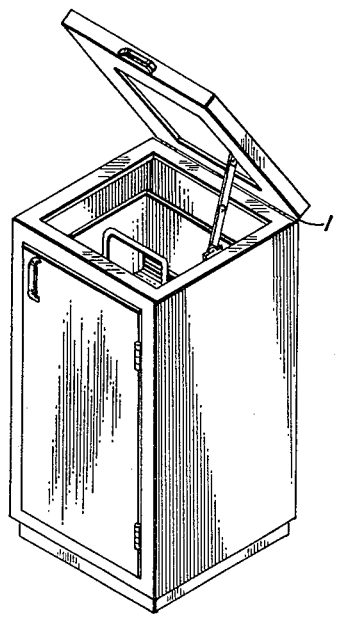
FIG. 1.
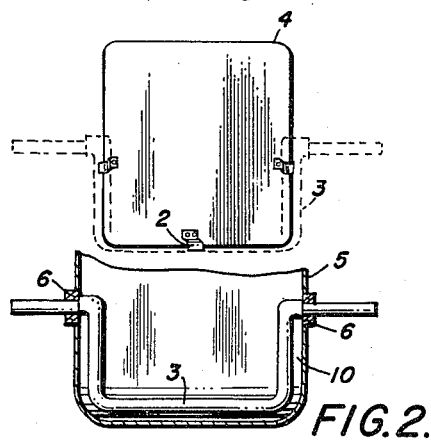
FIG. 3.
FIG. 2.
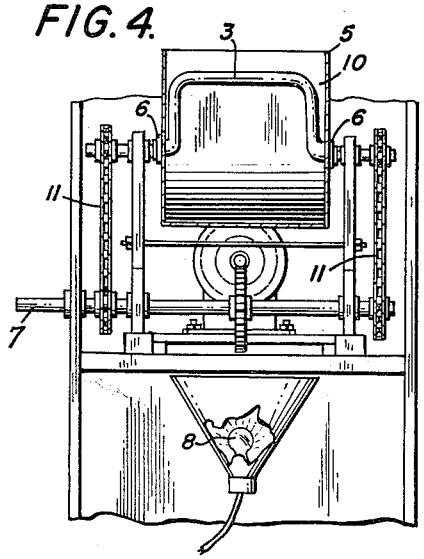
FIG. 4.
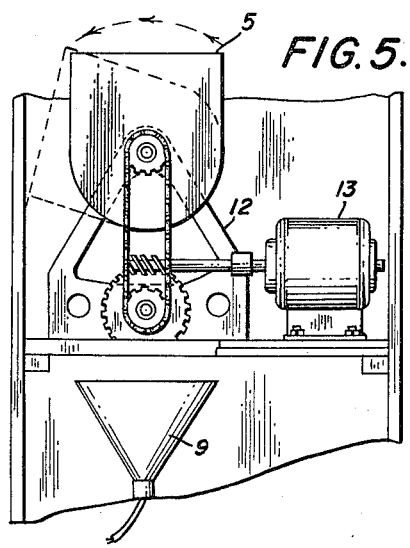
FIG. 5.
INVENTOR
Sigmond Wegh

United States Patent Office 3,169,753
Patented Feb. 16, 1965

3,169,753
ELECTRIC HOUSEHOLD BREAD AND BUTTER
AND PASTRY MACHINE
Sigmond Wegh, 7112 Farrell Road, Calgary,
Alberta, Canada
Filed Mar. 26, 1962, Ser. No. 183,330
1 Claim. (Cl. 259—110)

This invention relates to a bread and pastry dough mixing and proofing machine. A very important feature of this machine is the single mixing bar suitable for mixing dough and having a plate attachment for churning butter, so that it can be operated by any inexperienced operator for home baking in the same manner that other electrical household appliances are used at present.

The machine is housed in an attractive cabinet which encloses all moving parts for safety. It is warmed to a temperature suitable for mixing dough, and after mixing the dough remains in the mixer receptacle for proofing or raising until the dough matures for panning and baking.

In the accompanying drawing which illustrates a suitable embodiment of the invention;

FIGURE 1 is a perspective view of a cabinet enclosing my machine and having its lid open to expose a fragment of the mixing bar;

FIGURE 2 is a fragmentary sectional view of the mixing receptacle with the mixing bar mounted therein;

FIGURE 3 is a detail view of the churning plate installed on a mixing bar shown in phantom;

FIGURE 4 is a fragmentary front elevation, the cabinet and mixing receptacle being shown sectionally to expose the operational gearing and mixing bar; and FIGURE 5 is a fragmentary side elevation, the cabinet being shown sectionally to expose the operational gearing.

Referring to FIG. 1 of the drawing, the cabinet 1 is divided into upper and lower compartments respectively with one door complete with handle and a lid hinged on the top of the cabinet and supported in open position by a lid prop of well known construction.

In the upper compartment of the cabinet is mounted the receptacle 5 in which the dough ingredients to be mixed, or the cream or milk to be churned, are placed when it is in an upright position. After the mixing or churning is completed the receptacle is tilted in the direction indicated by the arrows in FIG. 5 to the position indicated in broken lines in this view for discharge of its contents upon opening the cabinet door.

In FIGURE 2 of the drawing the most important character is a U-shaped single mixing bar which is designated by the numeral 3. This bar or beater 3, which is rotatable within receptacle 5, is the mixing and working element for the conversion of the flour and ingredients into dough during its rotation. The two ends of this bar are integral with the shaft 3, so that it rotates crankwise therewith and within the receptacle.

FIGURE 3 shows plate 4 attached to bar 3 for the churning of butter. Plate 4 is inserted into the U-shaped mixing bar 3 with clamps 2 on vertical and horizontal parts of bar 3. Bar 3 is shown by phantom lines in FIGURE 3.

Referring again to FIG. 2, which shows a most important improvement, at 10 is designated a one inch space between the wall of the receptacle and mixing bar 3. This space allows the dough to be worked to a proper smoothness. With plate 4 removed from bar 3 after churning, and bar 3 set in motion once more, this space 10 allows for working the liquid out of the butter in its finishing stages without any hand labour employed.

Referring to FIG. 4, it will be seen that each end of bar 3 projects through a side wall of receptacle 5 and packing gland 6. A drive shaft 7 mounted in frame 12, and driven from motor 13, carries sprockets driving sprocket chains 11 and thereby driving sprockets on the projecting ends of bar 3 to revolve same within receptacle 5. A warming element, such as a lamp 8 within a reflector 9, is disposed in the lower compartment of the cabinet to heat air serving to cause rising of the dough in receptacle 5.

What is claimed is:

A dough mixer and churn comprising a receptacle adapted to contain ingredients to be mixed in the preparation of dough, or milk or cream to be churned; a beater having ends revolubly mounted in said receptacle and provided therebetween at one side of said ends with a U-shaped, crank-like section rotatable within said receptacle; a plate-like churning member entirely covering the space within said crank-like section and detachably secured to said section and projecting therefrom to the opposite side of the beater ends; and means for revolving said beater whereby said churning member will churn butter or cream in said receptacle and upon detachment of said churning member from the beater said crank-like section of the beater will mix dough ingredients in the receptacle.

References Cited by the Examiner
UNITED STATES PATENTS

| 917,921 | 4/09 | Bowman | 107—40 |
| 946,300 | 1/10 | Wilson | 107—40 |
| 1,133,997 | 3/15 | Nelson | 107—7.6 |

FOREIGN PATENTS 489,186  12/52  Canada.

ROBERT E. PULFREY, Primary Examiner.
CHARLES A. WILLMUTH, Examiner.